United States Patent Office  3,832,256
Patented Aug. 27, 1974

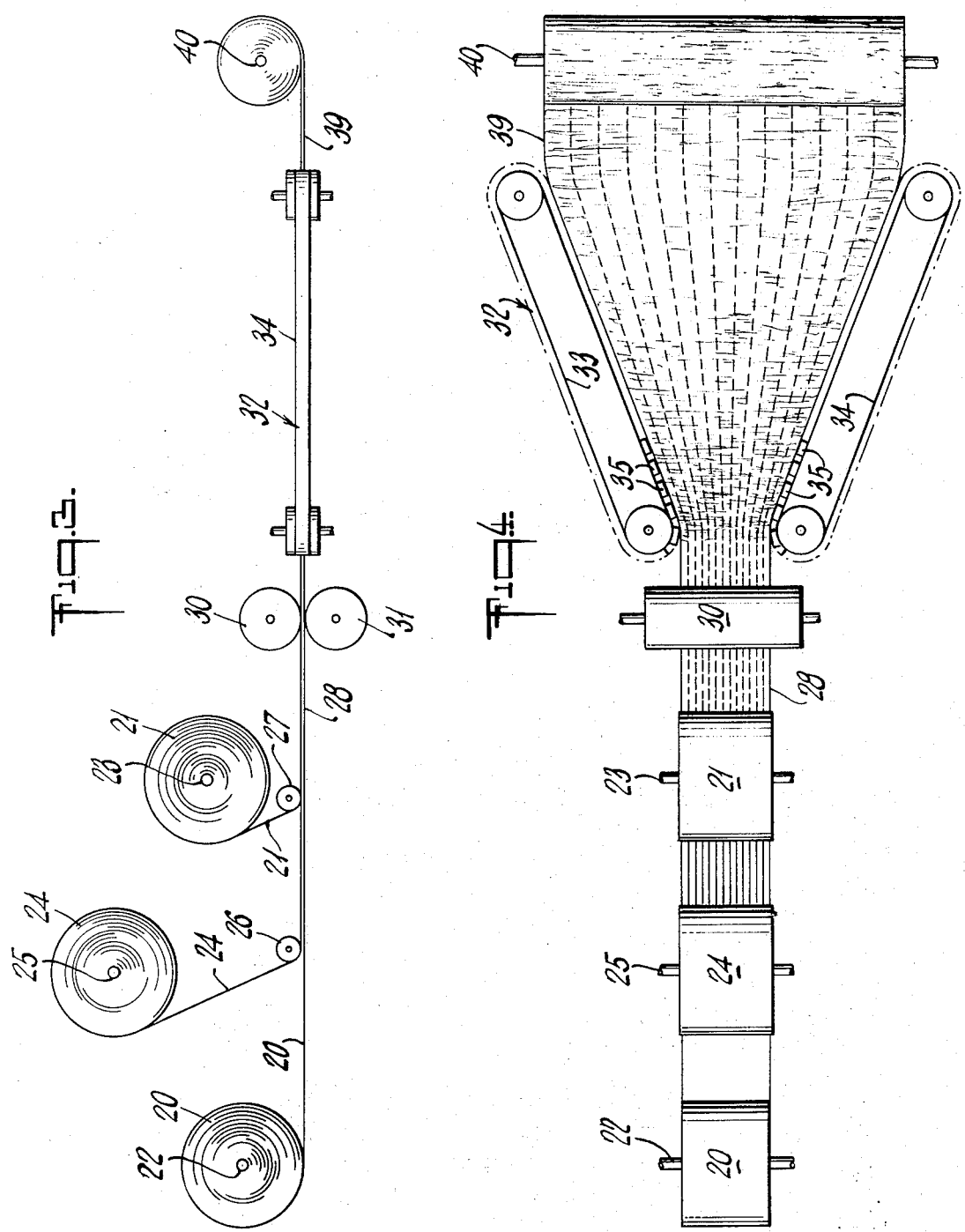

3,832,256
FABRIC AND METHOD FOR MANUFACTURING THE SAME
Frank Kalwaites, Gladstone, N.J., assignor to Johnson & Johnson
Filed Nov. 3, 1971, Ser. No. 195,184
Int. Cl. B32b 5/02, 31/16
U.S. Cl. 156—179                    1 Claim

ABSTRACT OF THE DISCLOSURE

A new fabric comprising yarns embedded in substantially unoriented thermoplastic polymer film with the yarns extending in the longitudinal direction of the fabric. Adjacent yarns are connected to each other by transversely oriented film areas preferably in the form of filaments or fibers. My new fabric is manufactured by placing an unoriented film on each side of a set of yarns and heating the laminate to combine the yarns and film. The laminate is transversely stretched to orient the film between the yarns into a plurality of highly molecularly oriented areas.

The present invention relates to a new fabric of longitudinally extending yarns and transversely extending oriented film areas and a method for manufacturing the same.

BACKGROUND OF THE INVENTION

For many years attempts have been made to develop new methods for producing fabrics. Hopefully these new methods would have greater speeds than a standard weaving loom or knitting machine and hence be considerably more economical than present methods for making woven and knitted fabrics. Also, hopefully the resultant fabric would have strength properties equivalent to woven and knitted fabrics. Some of these techniques have resulted in what is known as "nonwoven fabric" industry today. However, none of the commercially developed nonwoven fabric processess have been able to produce fabrics having strengths equivalent to woven or knitted materials at the hoped for economical speeds.

SUMMARY OF THE INVENTION

I have now discovered a new fabric which is not woven or knitted by standard techniques and has strength characteristics equivalent to those of woven or knitted materials. My new fabric may be produced at very high speeds, greatly in excess of the speed at which a fabric is produced by a standard weaving loom, and hence my new method for producing the fabric has a considerable economical advantage over present day methods.

In accordance with the present invention my new fabric comprises a plurality of yarns extending in the longitudinal direction of the fabric. Each of these yarns is embedded and substantially surrounded about its circumference by substantially unoriented thermoplastic polymer film. The embedded yarns are attached to adjacent yarns by a plurality of highly oriented film areas extending in the transverse direction of the fabric with the orientation in the film areas being in the transverse direction of the fabric.

My new fabric is manufactured by taking a plurality of yarns and placing a thermoplastic film on each side of the plurality of yarns. The three ply laminate is heated and pressed together to adhere the films to the yarns and to each other between adjacent yarns. The laminate is transversely stretched to molecularly orient the film area between adjacent yarns in the transverse direction and form a plurality of highly oriented transversely connecting film areas between adjacent yarns.

BRIEF DESCRIPTION OF THE DRAWINGS

The invention will be more fully described in conjunction with the accompanying drawings wherein:
FIG. 3 is a schematic side view depicting one method for producing a fabric in accordance with the present invention; and,
FIG. 4 is a schematic top view depicting the method of FIG. 3 for producing a fabric in accordance with the present invention.

DETAILED DESCRIPTION OF THE INVENTION

Figure 1:
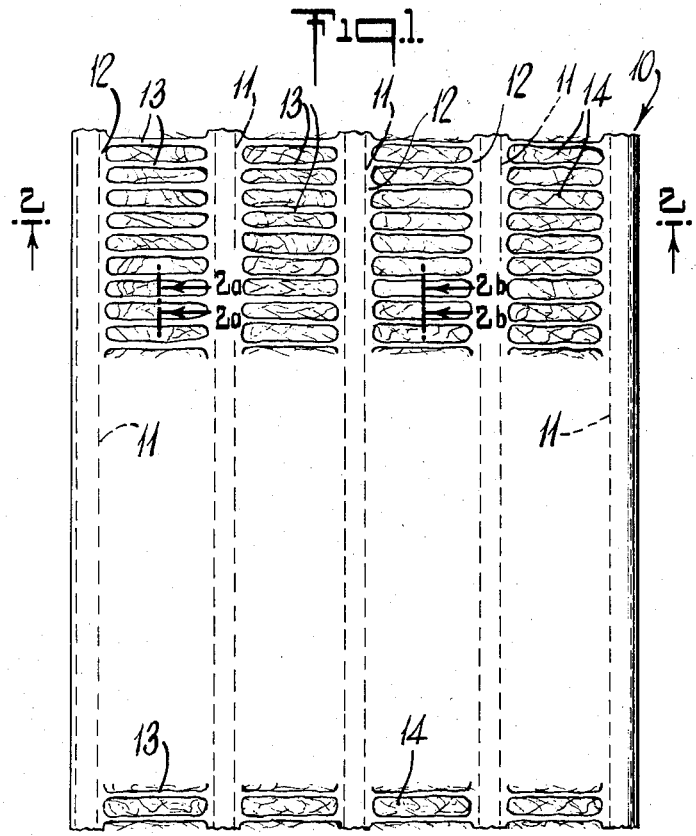
FIG. 1 is a plan view of my new fabric in accordance with the present invention.
Figure 2:
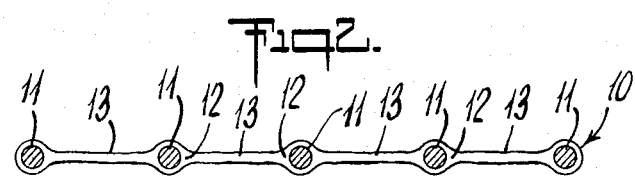
FIG. 2 is a cross-sectional view taken along line 2—2 of FIG. 1.

Referring to the drawings in FIGS. 1 and 2 there is shown my new fabric 10 comprising yarns 11 extending in the longitudinal direction of the fabric. The yarns are substantially completely surrounded or encased in unoriented thermoplastic film 12. The yarns are connected in the transverse direction of the fabric by a plurality of highly oriented film areas 13. These film areas may be thin ribbon-like areas or they may be in the form of filaments or in other various forms. The areas are highly oriented and preferably have short fibrous portions 14 in between the film areas.

In FIGS. 3 and 4 there is schematically depicted a method for producing the fabrics of the present invention. Two rolls of film 20 and 21, preferably of the same composition are fed from standard let off mechanisms 22 and 23. A beam of yarns 24 is also let off from a standard let off mechanism 25. The films and yarns are laminated together with the yarns between the films. The yarns 24 are laid on top of the first film 20 as the yarns pass under the guide roll 26 and the second film 21 is laid on top of the yarns as the film passes under the guide roll 27. The three ply laminate 28 is passed through a pair of heated and pressure applying rolls 30 and 31 to adhere the films together between adjacent yarns and adhere both the films to the yarns. The heated laminate is then passed through a tenter frame 32. The tenter frame comprises a pair of diverging chain conveyors 33 and 34 carrying clips 35 which grip and hold the laminate. The laminate is gripped at the closest point between the conveyors and the laminate is gradually stretched in the transverse direction to the desired width as the conveyors diverge. When the desired width is reached the clips release the laminate and the stretched laminate 39 is carried forwardly to the roll up mechanism 40. The diverging conveyors transversely stretch the film and orient the film between adjacent yarns into a plurality of highly oriented transverse film areas connecting adjacent yarns to produce the fabric of the present invention.

In producing the fabrics of the present invention any of the thermoplastic, orientable film materials may be used. Examples of suitable thermoplastic film materials are the polyolefins, such as polyethylene and polypropylene; the polyesters and the like. Generally the films will have a thickness of about 1 to 6 mils.

The yarns which are disposed between the films and laminated therewith, may comprise any of the monofilament, multifilament or spun yarns made from natural, artificial or synthetic fibers, such as, cotton spun yarns; rayon spun monofilament or multifilament yarns; the nylon or polyester, spun monofilament or multifilament yarns; and the like.

The three ply laminate is heated and pressed together. The laminate is heated to a temperature sufficient to adhere the film to itself and to the yarns. The temperature will vary depending on the melting point of the film used and the pressure applied.

Figure 2A:
FIGS. 2a and 2b are enlarged cross-sectional views taken along lines 2a—2a and 2b—2b respectively of FIG. 1 to depict different types of configurations in the transversely extending film areas of my new fabric.
Figure 2B:

A simple technique for forming the laminate is to pass the three plies between a pair of heated and pressure applying rolls as previously described. After the laminate is pressed together and adhered it is stretched in its transverse direction at a ratio of from about 3 to 1 to 12 to 1 or more. The portion of the film adhered to the yarns is substantially unchanged and remains as an unoriented polymer positioned about the yarns. The film between adjacent yarns is highly oriented in the transverse direction of the fabric and is oriented to a degree that it splits or fibrillates and forms a multiplicity of filament-like areas which connect adjacent yarns. These film areas will usually have openings between adjacent areas. The film areas may be ribbon-like in cross section as shown in FIG. 2a or have an oval or circular cross-section as depicted in FIG. 2b and the like. In many products the open areas, as a result of the high degree of orientation of the film between yarns, will fibrillate and form a plurality of small short fibers extending from the film areas into the open areas.

The resultant fabric may be used by itself or it may be laminated with other materials for a variety of end uses such as packaging materials, protective covers, apparel and the like.

The following example is illustrative of one fabric according to the present invention.

EXAMPLE

Two unoriented high density polyethylene films, each six inches wide and four mils thick, are laminated to a layer of 20s count cotton yarns with one of the films on each side of the yarn layer. The layer of yarns is six inches wide and contains approximately 24 yarns with a quarter inch spacing between each yarn. The three ply laminate is heated to a temperature of about 325° F. by passing it between a pair of heated rolls which apply pressure to the laminate of about 20 pounds per linear inch. The heat and pressure adheres the film to the yarns and also adheres the films to each other between the yarns. The laminate without cooling, is transversely stretched at a ratio of 8 to 1. The six inch wide materials is stretched to a width of approximately 48 inches to provide about a 2 inch spacing between adjacent cotton yarns. The adhered films between the cotton yarns is highly oriented in the transverse direction and forms a plurality of highly transversely oriented ribbon-like film areas. The resultant fabric is strong in both the longitudinal and transverse directions and is porous and may be used for packaging materials and the like.

The invention not to be limited to the precise forms of details herein set forth as these may be varied to suit particular requirements.

What is claimed is:

1. A method for producing a new fabric comprising: forming a three ply laminate, the center ply of said laminate being a plurality of spaced apart yarns extending in the longitudinal direction of the laminate and the outer plies of said laminate being unoriented thermoplastic polymer film, applying heat and pressure to the laminate to adhere the film to the yarns and to adhere the films to each other between adjacent yarns, and stretching the adhered laminate in the transverse direction at a ratio of from about 3 to 1 to 12 to 1 to molecularly orient the film between adjacent yarns, said film being oriented to a degree that it fibrillates to form a plurality of film areas which connect adjacent yarns.

References Cited

UNITED STATES PATENTS

| 3,053,717 | 9/1962 | Bright | 154—52 |
| 3,248,274 | 4/1966 | Karass | 161—60 |
| 3,391,050 | 7/1968 | Nebesar | 161—143 |
| 3,576,705 | 4/1971 | Goldsworthy | 161—143 |
| 3,627,572 | 12/1971 | Barnett | 117—126 |

GEORGE F. LESMES, Primary Examiner

S. S. SILVERMAN, Assistant Examiner

U.S. Cl. X.R.

156—212, 229, 276; 161—143, 402